United States Patent
Wang et al.

(10) Patent No.: US 9,825,460 B2
(45) Date of Patent: Nov. 21, 2017

(54) CABLE DROP COMPENSATION CIRCUIT AND POWER CIRCUIT USING THE SAME

(71) Applicant: GREEN SOLUTION TECHNOLOGY CO., LTD., New Taipei (TW)

(72) Inventors: Chen-Hsung Wang, New Taipei (TW); Che Wang, New Taipei (TW); Shian-Sung Shiu, New Taipei (TW); Zhong-Wei Liu, Wuxi (CN)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 281 days.

(21) Appl. No.: 14/706,561

(22) Filed: May 7, 2015

(65) Prior Publication Data

US 2015/0333514 A1 Nov. 19, 2015

(30) Foreign Application Priority Data

May 14, 2014 (CN) .......................... 2014 1 0203634

(51) Int. Cl.
| | |
|---|---|
| *H02J 1/06* | (2006.01) |
| *H02J 1/14* | (2006.01) |
| *H02M 3/156* | (2006.01) |
| *H02J 1/04* | (2006.01) |
| *H02M 1/32* | (2007.01) |
| *H02M 1/00* | (2006.01) |

(52) U.S. Cl.
CPC ............ *H02J 1/06* (2013.01); *H02J 1/04* (2013.01); *H02J 1/14* (2013.01); *H02M 1/32* (2013.01); *H02M 3/156* (2013.01); *H02M 2001/0009* (2013.01); *H02M 2001/0025* (2013.01)

(58) Field of Classification Search
CPC .......... G05F 1/461; G05F 1/565; G05F 1/577; H02J 1/04; H02J 1/06
See application file for complete search history.

(56) References Cited

U.S. PATENT DOCUMENTS

| | | | | |
|---|---|---|---|---|
| 5,844,440 A | * | 12/1998 | Lenk ...................... | G05F 1/573 327/110 |
| 8,035,254 B2 | | 10/2011 | Djenguerian et al. | |

(Continued)

FOREIGN PATENT DOCUMENTS

| | | |
|---|---|---|
| CN | 101860243 A | 10/2010 |
| CN | 102832806 A | 12/2012 |

(Continued)

*Primary Examiner* — Jeffrey Zweizig
(74) *Attorney, Agent, or Firm* — Muncy, Geissler, Olds & Lowe, P.C.

(57) ABSTRACT

A cable drop compensation circuit includes a current detection circuit, a compensation judgment circuit, and a compensation circuit. The current detection circuit detects a load current supplied to a load by a DC output circuit, so as to generate a current detection signal. The compensation judgment circuit receives the current detection signal, and generates a judgment signal when judging the load current higher than a predetermined compensation value. When receiving the judgment signal, the compensation circuit generates a compensation signal. In response to the compensation signal, the DC output circuit raises an output voltage by a compensation voltage.

15 Claims, 4 Drawing Sheets

(56) References Cited

U.S. PATENT DOCUMENTS

| | | | |
|---|---|---|---|
| 8,513,934 B2* | 8/2013 | Hirose | H02M 3/156 323/284 |
| 8,686,701 B2* | 4/2014 | Ting | H02M 3/156 323/282 |
| 9,099,919 B2* | 8/2015 | Jing | H02M 3/156 |
| 9,130,457 B2* | 9/2015 | Shi | H02M 3/1588 |
| 9,158,314 B2* | 10/2015 | Kung | G05F 1/10 |
| 2010/0117458 A1 | 5/2010 | Reithmayer et al. | |
| 2013/0027984 A1 | 1/2013 | Takegami | |
| 2013/0027987 A1 | 1/2013 | Yang et al. | |

FOREIGN PATENT DOCUMENTS

| | | |
|---|---|---|
| CN | 103558891 A | 2/2014 |
| CN | 103605395 A | 2/2014 |
| EP | 1278284 A1 | 1/2003 |
| JP | S5899812 A | 6/1983 |
| JP | 2009254002 A | 10/2009 |
| TW | I429174 B | 3/2014 |

* cited by examiner

CABLE DROP COMPENSATION CIRCUIT AND POWER CIRCUIT USING THE SAME

BACKGROUND OF INVENTION

1. Field of Invention

The present invention relates to a cable drop compensation circuit, in particular, relates to a DC output power circuit using the cable drop compensation circuit.

2. Related Prior Art

In general, a cable resistance exists in a power cable between a power supply and a load and, therefore, there's a voltage drop between the power and the load. The voltage drop is proportional to a current of the load. An excessive voltage drop will make a load voltage received by the load lower than an acceptable voltage range for a normal operation, thus causing a problem that the load cannot work properly.

Figure 1:
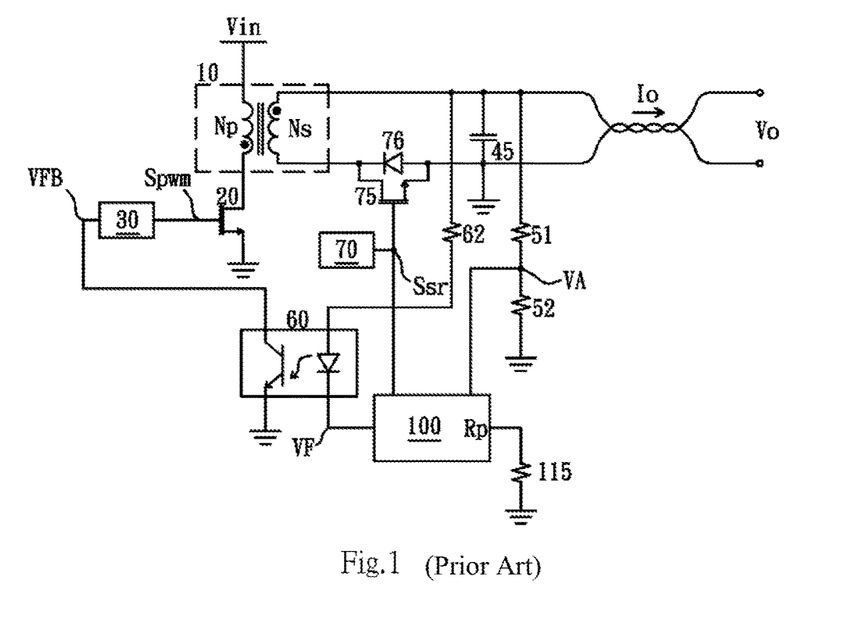
FIG. 1 is a schematic diagram of a power conversion circuit with cable drop compensation disclosed in the U.S. Patent Publication No. US20130027987.

In order to compensate for the voltage drop of the power cable, a conventional power supply compensates for the voltage drop according to the load current so that the load voltage received by the load is kept at a predetermined value of load voltage. Referring to FIG. 1, there is a power conversion circuit with cable drop compensation of which details are disclosed in the U.S. Patent Publication No. US20130027987. The power conversion circuit includes a transformer 10, power transistors 20 and 75, a pulse width modulation (PWM) controller 30, a photo coupler 60, a synchronous rectification controller 70, and a regulation circuit 100, and is used for converting an input voltage $V_{in}$ into an output voltage $V_o$. The power transistor 20 is coupled to a primary winding $N_p$ of the transformer 10 and the ground, and is used for switching the transformer 10. The PWM controller 30 generates a switching signal $S_{pwm}$ to switch the power transistor 20 to adjust the output voltage $V_o$ according to a feedback signal $V_{FB}$. An output capacitor 45 is coupled to a secondary winding $N_s$ of the transformer 10 for regulating the output voltage $V_o$. The photo coupler 60 is coupled to the secondary winding $N_s$ via a resistor 62 and generates the feedback signal $V_{FB}$ to the PWM controller 30 based on the output voltage $V_o$. The secondary winding $N_s$ of the transformer 10 is coupled to the load to provide an output voltage $V_o$ via a power cable, and a load current $I_o$ goes through the power cable.

The power conversion circuit has a synchronous rectification circuit to improve the conversion efficiency thereof. The synchronous rectification circuit includes a synchronous rectification controller 70 and a power transistor 75, and the power transistor 75 has a parasitic diode 76. The power transistor 75 is used to replace traditional diodes for rectification, wherein the drain of the power transistor 75 is coupled to the secondary winding $N_s$, and the parasitic diode 76 is arranged between the drain and the source of the power transistor 75. The synchronous rectification controller 70 generates and sends a synchronous rectification signal $S_{sr}$ to the gate of the power transistor 75 to turn on and off the power transistor 75.

The regulation circuit 100 receives the synchronous rectification signals $S_{sr}$ and a voltage divider signal $V_A$ to generate and send a signal $V_F$ to the photo coupler 60. The voltage divider signal $V_A$ is generated by a voltage divider consisting of resistors 51 and 52 based on the output voltage $V_o$. Therefore, the feedback signal $V_{FB}$ is generated according to the output voltage $V_o$. Furthermore, a resistor 115 is coupled to a terminal $R_p$ of the voltage regulation circuit 100. The synchronous rectification signal $S_{sr}$ is related to the output current $I_o$, and the compensation amount can be programmed by the resister 115. Thus, the output voltage $V_o$ can be adjusted according to the synchronous rectification signal $S_{sr}$ and the resistor 115 for compensating the voltage drop of the power cable.

However, such circuit structure of the voltage regulation circuit 100 is complicated, and cannot be applied to multiple loads that suffer from different power cable voltage drops.

SUMMARY OF INVENTION

In view of that the prior art involves a complicated circuit and cannot be applied for cable drop compensation of multiple loads. The present invention actuates cable drop compensation only when the load current is greater than a predetermined value. The circuit of the present invention is relatively simple. Furthermore, the present invention can provide an acceptable effect of the cable drop compensation when applied to multiple loads.

In order to achieve the above object, the present invention provides a cable drop compensation circuit, including a current detection circuit, a compensation judgment circuit, and a compensation circuit. The current detection circuit detects a load current supplied by a DC output circuit to a load, and accordingly generates a current detection signal. The compensation judgment circuit receives the current detection signal, and generates a judgment signal when judging the load current to be higher than a predetermined compensation value. When receiving the judgment signal, the compensation circuit generates a compensation signal. In response to the compensation signal, the DC output circuit raises an output voltage by a compensation voltage.

The present invention further provides a power circuit with cable drop compensation, including a DC output circuit and at least two cable drop compensation circuits. The DC output circuit is used for providing an output voltage, adjusting the output voltage according to a feedback signal. The at least two cable drop compensation circuits are respectively coupled between the DC output circuit and a corresponding load. Each cable drop compensation circuit includes a current detection circuit, a compensation judgment circuit and a compensation circuit. The current detection circuit detects a load current of the corresponding load, and generates a current detection signal accordingly. The compensation judgment circuit receives the current detection signal and generates a judgment signal when judging the load current to be greater than a predetermined compensation value. The compensation circuit generates a compensation signal when receiving the judgment signal. In response to at least one of these compensation signals, the DC output circuit raises the output voltage by a compensation voltage.

Furthermore, the cable drop compensation circuits and the DC output circuit with the cable drop compensation circuits of the present invention may further include a protection circuit which can protect the circuit from any possible damages when the application environment exceeds a preset operating range.

The foregoing summary and the following detailed description are used to further illustrate the claims of the present invention. Other objects and advantages of the present invention will be further understood by the following detailed description and drawings.

DETAILED DESCRIPTION OF EMBODIMENTS

Figure 2:
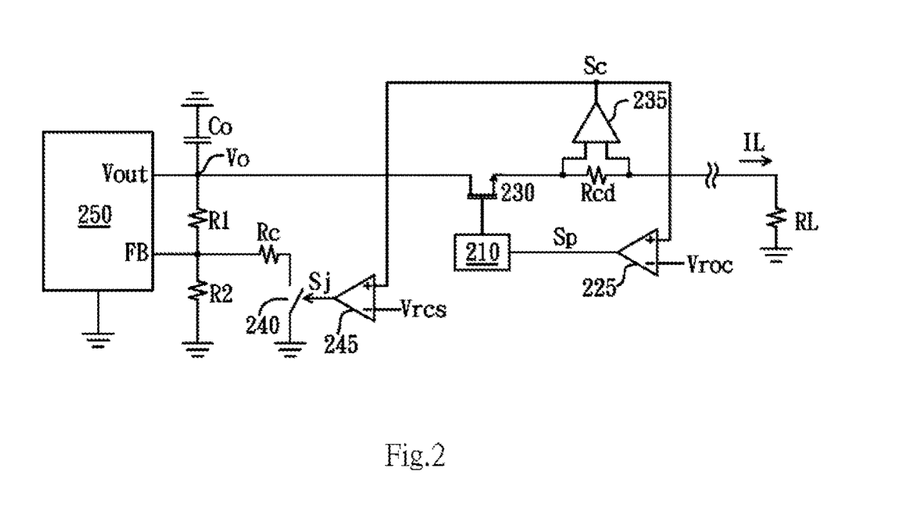
FIG. 2 is a schematic diagram showing a cable drop compensation circuit based on a first embodiment of the present invention.

FIG. 2 is a schematic diagram showing a cable drop compensation circuit based on a first preferred embodiment of the present invention. The cable drop compensation circuit is coupled between a DC output circuit 250 and a load RL, and the cable drop compensation circuit is connected with the load RL via a power cable. The DC output circuit 250 provides an output voltage at an output terminal $V_{out}$. An output capacitor $C_o$ is coupled to the output terminal $V_{out}$ to stabilize the output voltage $V_o$. The resistors $R_1$ and $R_2$ are connected in series between the output terminal $V_{out}$ and a common potential (ground potential). The connection node of the resistors $R_1$ and $R_2$ is coupled to a feedback terminal FB to provide a feedback signal representing the output voltage $V_o$. The DC output circuit 250 regulates the output voltage $V_o$ according to the feedback signal.

The cable drop compensation circuit includes a current detection circuit, a compensation judgment circuit and a compensation circuit. The current detection circuit includes an amplifier 235, generating a current detection signal $S_c$ based on the voltage difference between both ends of a current detection resistor $R_{cd}$. The voltage difference between the ends of the current detection resistor $R_{cd}$ is proportional to the current flowing therethrough, that is, a load current IL supplied by the DC output circuit 250 to the load RL. Therefore, the current detection signal $S_c$ can represent the load current $I_L$. The compensation judgment circuit includes a comparator 245. A non-inverting terminal of the comparator 245 receives the current detection signal $S_c$ and an inverting terminal thereof receives a compensation reference voltage $V_{rcs}$. When the current detection signal $S_c$ is greater than the compensation reference voltage $V_{rcs}$, i.e., the load current $I_L$ is greater than a predetermined compensation value, the comparator 245 outputs a judgment signal $S_j$. The compensation circuit includes a switch 240 connected to a compensation resistor $R_c$ in series. The compensation resistor $R_c$ is coupled to the connection node of the resistor $R_1$ and the resistor $R_2$. When the load current $I_L$ is less than the predetermined compensation value, the switch 240 is turned off. In this case, the cable drop compensation circuit does not compensate the output voltage $V_o$ and so the output voltage $V_o$ of the DC output circuit 250 is stabilized at a predetermined output voltage. However, when the load current $I_L$ is greater than the predetermined compensation value, the compensation judgment circuit outputs the compensation signal $S_j$ to turn on the switch 240. When the switch 240 is turned off, the division ratio of the resistors $R_1$ and $R_2$ is $r_2/(r_1+r_2)$, wherein $r_1$ and $r_2$ are the resistances of the resistors $R_1$ and $R_2$. In this case, the ratio of the feedback signal to the output voltage $V_o$ is $r_2/(r_1+r_2)$. When the switch 240 is turned on, the ratio of the feedback signal to the output voltage $V_o$ reduces to $r/(r_1+r)$ for the compensation resistor $R_c$ is in parallel with the resistor $R_2$, and $r=r_2*r_c/(r_2+r_c)$, wherein $r_c$ is the resistance of the resistor $R_c$. The DC output circuit 250 will adjust the output voltage $V_o$ to raise the feedback signal back to the same value before the compensation. Since the resistances of $r_1$, $r_2$ and $r_c$ are constant values, the compensation voltage raised in the output voltage is a constant portion of the output voltage. In the case, since the output voltage is retained at a predetermined output voltage, the compensation voltage is a constant value.

For example, the DC output circuit is a voltage source for Universal Serial Bus (hereinafter referred as USB), the nominal output voltage is 5V±0.25V, and the nominal output current is 1 A. The cable drop compensation circuit of the present invention may set a predetermined compensation value and compensation voltage according to the specification thereof. For instance, the predetermined compensation value is set to be 1 A of the nominal output current, and the compensation voltage is set to be 0.25V of the maximum tolerance value of the output voltage. Therefore, when the load current is 1 A, the voltage received by the load may be lower than 4.75V. In this case, the cable drop compensation circuit compensates the output voltage back up to 5V to ensure that the load voltage can be retained within the specification. Of course, setting the predetermined compensation value and the compensation voltage based on the specification of the application circuit ensures that the circuit operates within the specification, but the set values are not necessary to be the maximum tolerance value or the nominal value. For example, in the above-mentioned example, the predetermined compensation value and compensation voltage can be set to be 0.5 A and 0.25V, 1 A and 0.125V, or 0.5 A and 0.125V, etc.

As mentioned above, when the load current exceeds the predetermined compensation value, the cable drop compensation circuit of the present invention starts to compensate the cable drop, so that the design of the circuit is quite simple, which ensures that the system operates within specifications. Furthermore, the current detection circuit, the compensation judgment circuit and the compensation circuit can be encapsulated in a single package, and so the cable drop compensation circuit becomes a single integrated circuit. The resistor $R_c$ may be an external component coupled to the compensation judgment circuit via a pin of the package. Thereby, the user can adjust the compensation voltage by the resistor $R_c$, so that the application of the cable drop compensation circuit can be more flexible.

The cable drop compensation circuit of the present invention may additionally include a protection circuit to further provide a protection function. Referring to FIG. 2 again, the protection circuit mainly includes a switch 230 and an overcurrent judgment circuit. The switch 230 is coupled between the DC output circuit 250 and the load $R_L$. When the load current IL is higher than an overcurrent protection value, the overcurrent judgment circuit cuts off the switch 230 to stop the load current $I_L$ supplied to the load $R_L$. In this embodiment, the overcurrent judgment circuit includes a comparator 225 and a drive circuit 210. A non-inverting terminal of the comparator 225 receives a current detection signal $S_c$, and an inverting terminal thereof receives an overcurrent reference voltage $V_{roc}$. When the current detection signal $S_c$ is higher than the overcurrent reference voltage $V_{roc}$, i.e., the load current $I_L$ is greater than an overcurrent protection value, the comparator 225 outputs a protection signal $S_p$ to the drive circuit 210. Therefore, the drive circuit 210 cuts off the switch 230 to stop the load current $I_L$ supplied to the load $R_L$. The overcurrent protection value is greater than a predetermined compensation value, generally greater than or equal to the nominal output current.

Of course, the protection circuit may be simultaneously encapsulated in a single package, so that the cable drop compensation circuit of the present invention becomes an integrated circuit.

Figure 3:
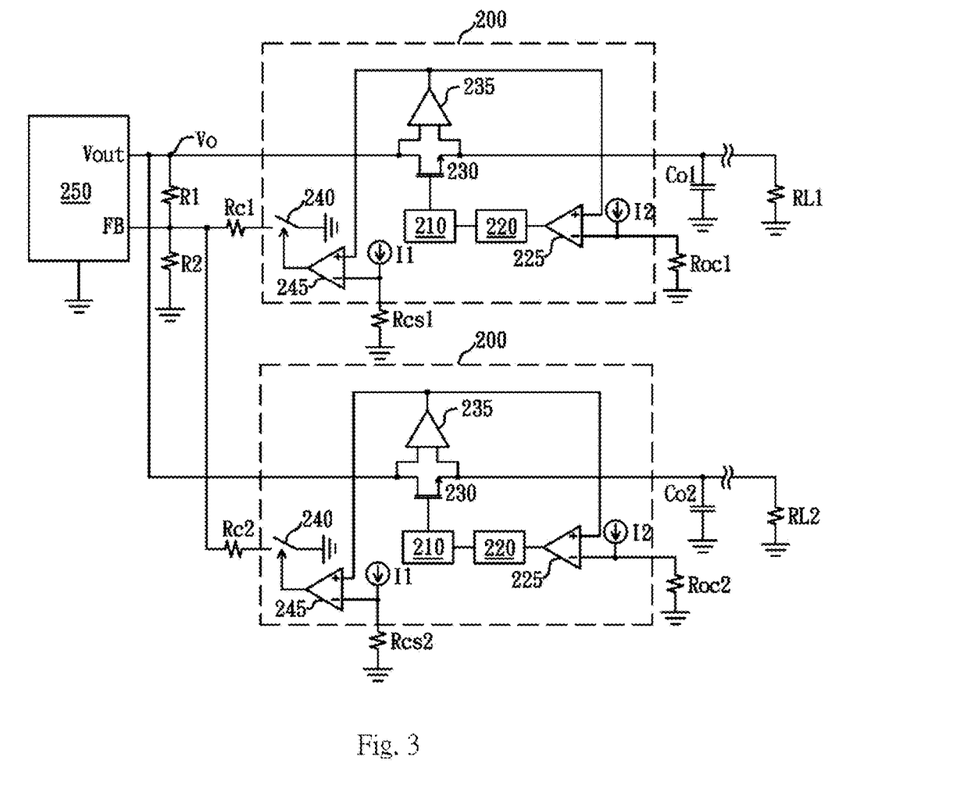
FIG. 3 is a schematic diagram showing a DC output circuit utilizing the cable drop compensation circuit of a second embodiment of the present invention.

FIG. 3 is a schematic diagram showing a DC output circuit using the cable drop compensation circuit of a second preferred embodiment of the present invention. The power circuit with cable drop compensation circuit includes a DC output circuit 250 and at least two cable drop compensation circuits 200. In this embodiment, two cable drop compensation circuits 200 are taken as an example. The DC output circuit 250 provides an output voltage $V_o$ at an output terminal $V_{out}$ thereof, and adjusts the output voltage $V_o$ in accordance with a feedback signal received by a feedback terminal FB thereof. Each of the cable drop compensation circuits 200 is an integrated circuit, which is coupled between the DC output circuit 250 and a corresponding load of loads $R_{L1}$ and $R_{L2}$. Each cable drop compensation circuit 200 includes a current detection circuit, a compensation judgment circuit and a compensation circuit. The current detection circuit detects a load current of the corresponding load, and generates a current detection signal accordingly. The compensation judgment circuit receives the current detection signal and generates a judgment signal when the load current is greater than a predetermined compensation value. The compensation circuit generates a compensation signal when receiving the judgment signal. The DC output circuit 250 raises the output voltage $V_o$ by a compensation voltage in response to the compensation signals. The cable drop compensation circuit 200 may be the cable drop compensation circuit shown in FIG. 2. However, in this embodiment, the cable drop compensation circuit 200 is slightly different from the cable drop compensation circuit shown in FIG. 2. The differences will be described in the following section.

The amplifier 235 of the current detection circuit detects both ends of the switch 230 of the protection circuit, and an equivalent impedance of the switch 230 is used as a current detection resistor to detect the load current flowing therethrough. Therefore, the current detection resistor $R_{cd}$ in FIG. 2 can be omitted.

The compensation reference voltage is generated by a current source $I_1$ flowing through a compensation reference resistor, which is provided to the inverting terminal of the comparator of the compensation judgment circuit 245. The compensation reference resistor can be an external resistor, which is coupled to the compensation judgment circuit via a pin of the cable drop compensation circuit 200. The compensation reference resistors of the cable drop compensation circuits 200 can be identical or different. For example, the cable drop compensation circuits 200 in this embodiment are coupled to the compensation reference resistors $R_{cs1}$ and $R_{cs2}$ respectively, so as to provide a preferred application circuits for a different application environment or a load.

The overcurrent reference voltage $V_{roc}$ is generated by a current source $I_2$ flowing through an overcurrent reference resistor and provided to the inverting terminal of the comparator 225 of the protection circuit. The overcurrent reference resistor can be an external resistor, which is coupled to the protection circuit via a pin of the cable drop compensation circuit 200. The overcurrent reference resistors of the cable drop compensation circuits 200 can be identical or different. For example, the cable drop compensation circuits 200 of this embodiment are respectively coupled to the overcurrent reference resistors $R_{oc1}$ and $R_{oc2}$, so as to provide a better circuit configuration for a different application or load. The protection circuit can additionally include a latch circuit 220, which is coupled to the comparator 225. When overcurrent occurs, the latch circuit 220 performs a latch protection, so that the drive circuit continuously cuts off the switch 230 until the circuit is restarted. This design can avoid the switch 230 from continuously being switched between on and off when the overcurrent problem cannot be solved by temporarily stopping the output of the load current.

In addition, in FIG. 2, the output capacitor $C_o$ is disposed between the DC output circuit 250 and cable drop compensation circuit, and in this embodiment, each of the output capacitors $C_{o1}$ and $C_{o2}$ is arranged between the corresponding cable drop compensation circuit 200 and the corresponding load. Therefore, the capacitance of the output capacitors $C_{o1}$ and $C_{o2}$ can be better allocated respectively according to the load $R_{L1}$ and $R_{L2}$.

The switches 240 of the two cable drop compensation circuits 200 are respectively coupled to the connection node of the resistors $R_1$ and $R_2$ via the compensation resistors $R_{c1}$ and $R_{c2}$, and the compensation effect can be achieved by adjusting the original division ratio of the resistors $R_1$ and $R_2$. Of course, the resistance of the compensation resistors $R_{c1}$ and $R_{c2}$ may be variable to provide a flexible circuit arrangement. The following example is based on the compensation resistors $R_{c1}$ and $R_{c2}$ having the same resistance.

The nominal current of each load is 2 A, and the range of the load voltage is 5V±0.25V. When the load current of any of the cable drop compensation circuits 200 reaches the nominal current, the cable drop compensation circuit 200 compensates the output voltage $V_o$ by 0.125V. When both two cable drop compensation circuits 200 compensate, the output voltage $V_o$ can be raised up by 0.125V+0.125 V=0.25V. In fact, when the compensation resistors $R_{c1}$ and $R_{c2}$ have the same resistance, the second compensation voltage is slightly less than the first compensation voltage, in which the small difference is ignored.

By the common cable drop compensation of the embodiment shown in FIG. 3, the compensation voltage of the output voltage $V_o$ is raised in a stepwise manner corresponding to the number of the compensation signals generated by the cable drop compensation circuits, and the compensation voltages increased in each step are quite close. In addition, as the description of FIG. 2, the predetermined compensation value, compensation voltage and overcurrent protection value of the embodiment in FIG. 3 may be determined according to the maximum tolerance value or nominal value of the specification of the application circuit, but not necessarily being the nominal value or the maximum tolerance value. In the above-mentioned example, the predetermined compensation value and compensation voltage may be set as 1 A and 0.125V, 2 A and 0.25V, 1 A or 0.25V, etc. The preferred compensation voltage is the maximum tolerance value of the output voltage divided by the number of the cable drop compensation circuits.

Figure 4:
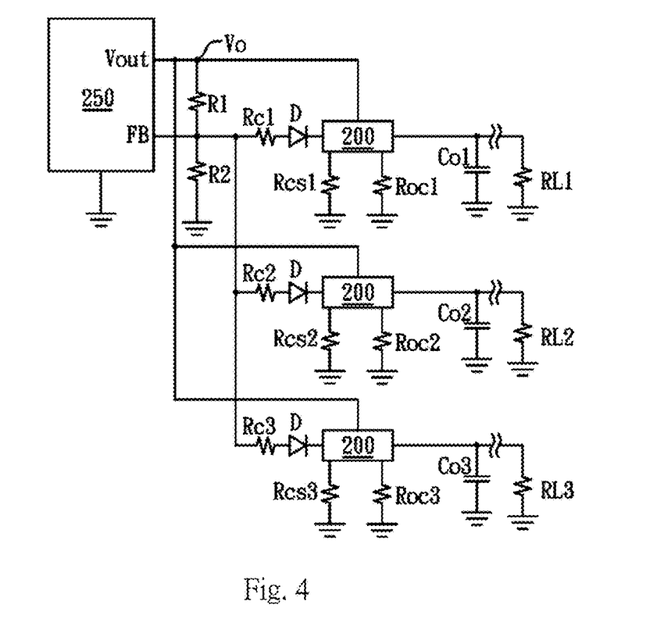
FIG. 4 is a schematic diagram showing another power circuit using the cable drop compensation circuit of the present invention.

FIG. 4 is a schematic diagram showing another power circuit using the cable drop compensation circuit of the present invention. In this embodiment, three cable drop compensation circuits are taken as the example. The three cable drop compensation circuits 200 are integrated circuits, respectively coupled between the DC output circuit 250 and the corresponding loads $R_{L1}$, $R_{L2}$ and $R_{L3}$. The cable drop compensation circuits 200 are set with corresponding compensation voltages in accordance with the external compensation resistors $R_{c1}$, $R_{c2}$ and $R_{c3}$ respectively. The cable drop compensation circuits 200 are set with corresponding predetermined compensation values in accordance with the external compensation reference resistors $R_{cs1}$, $R_{cs2}$ and $R_{cs3}$ respectively. The cable drop compensation circuits 200 are set with corresponding overcurrent protection values in accordance with the external overcurrent reference resistors $R_{oc1}$, $R_{oc2}$ and $R_{oc3}$ respectively.

In addition, the diodes D are added respectively between the cable drop compensation circuits 200 and their respective compensation resistors $R_{c1}$, $R_{c2}$ and $R_{c3}$, wherein the positive terminal of each diode D is coupled to the corresponding one of the compensation resistors $R_{c1}$, $R_{c2}$ and $R_{c3}$, and the negative terminal of the same is coupled to the corresponding cable drop compensation circuit 200. The addition of the diode D makes the compensation of the cable drop compensation circuit 200 be changed from a common compensation to a selective compensation. When any cable drop compensation circuit 200 is actuated, the compensation voltage is determined by this cable drop compensation circuit 200 alone. In other words, when the first actuated compensation circuit 200 will determine the compensation voltage and execute a one-time compensation, instead of the stepwise compensation executed in the embodiment shown in FIG. 3. Therefore, in this embodiment, the compensation resistors $R_{c1}$, $R_{c2}$ and $R_{c3}$ can be set with their respective compensation voltage to match the actual circuit applications for achieving better compensation results. Of course, assuming that the actual application environment cannot be specifically defined, it is preferred to set the preferred compensation voltage based on the maximum tolerance value of the output voltage such as 0.25V.

Figure 5:
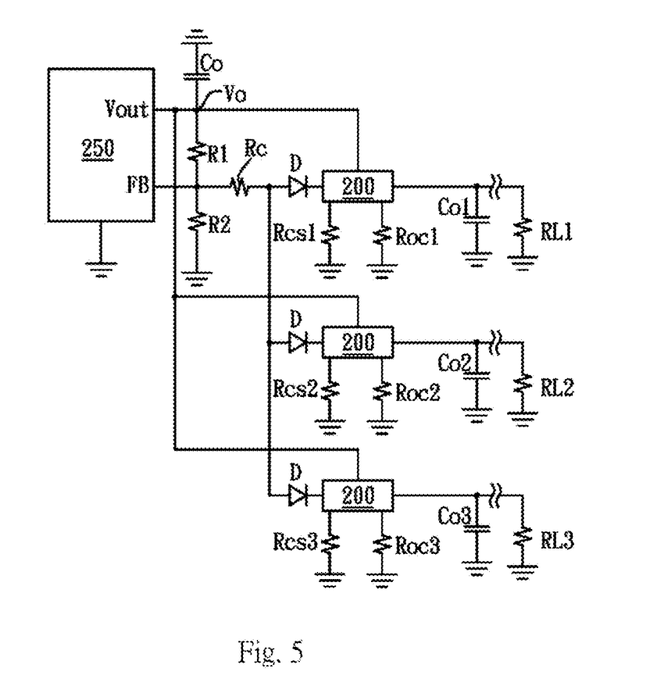
FIG. 5 is a schematic diagram showing an additional power circuit utilizing the cable drop compensation circuit of the present invention.

FIG. 5 is a schematic diagram showing an additional power circuit utilizing the cable drop compensation circuit of the present invention. Compared to the embodiment shown in FIG. 4, the main differences are the use of an output capacitor $C_o$ and the sharing of the compensation resistor. In FIG. 5, in addition to respectively setting the output capacitors $C_{o1}$, $C_{o2}$ and $C_{o3}$ between the cable drop compensation circuits 200 and the loads $R_{L1}$, $R_{L2}$ and $R_{L3}$, the output capacitor $C_o$ is also arranged between the DC output circuit 250 and the cable drop compensation circuit 200. Therefore, better voltage regulation can be achieved. The diode D is coupled to the connection node of the resistors $R_1$ and $R_2$ via a single compensation resistor $R_c$, which not only reduces the number of compensation resistors and cost, but also simplifies the respective setting compensation voltage to a single compensation voltage.

Figure 6:
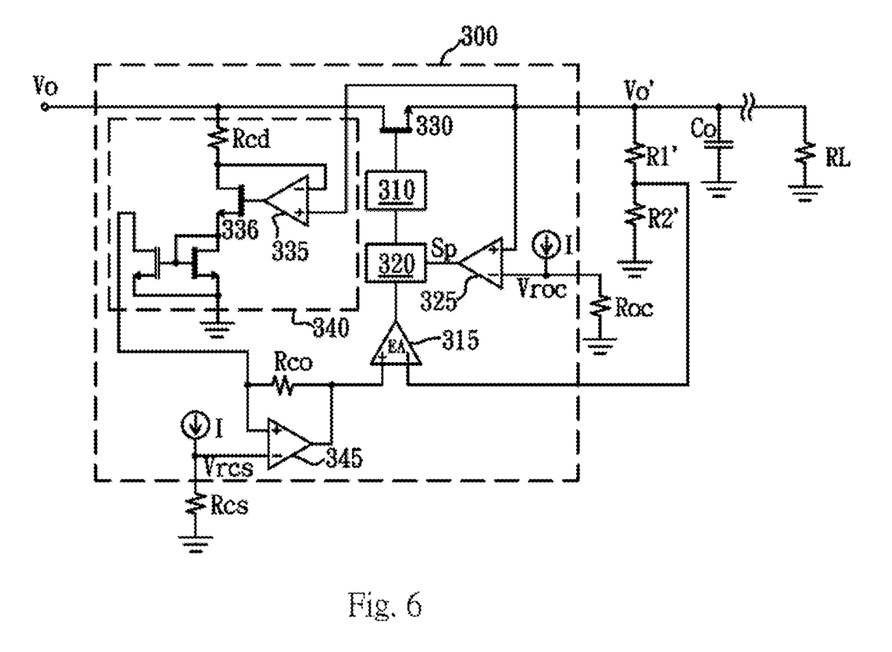
FIG. 6 is a schematic diagram showing a cable drop compensation circuit based on a third embodiment of the present invention.

FIG. 6 is a schematic diagram showing a cable drop compensation circuit based on a third preferred embodiment of the present invention. The cable drop compensation circuit 300 is arranged between an output circuit $V_o$ of a DC output voltage (not shown) and a load $R_L$, and the cable drop compensation circuit is connected to the load $R_L$ via a power cable. An output capacitor $C_o$ is coupled to the output terminal of the drop compensation circuit so as to stably provide the load $R_L$ with a compensation output voltage $V_o'$. The cable drop compensation circuit 300 includes a current detection circuit 340, a feedback control circuit and a compensation circuit. The current detection circuit is used for detecting the current of a load current, and includes an amplifier 335, a current detection resistor $R_{cd}$, a transistor 336 and a current mirror. An inverting terminal of the amplifier 335 is coupled to an end of a transistor 330 via the current detection resistor $R_{cd}$, and a non-inverting terminal thereof is coupled to another end 330 of the transistor 330.

An output terminal of the amplifier 335 is coupled to the transistor 336, and the amplifier 335 controls the equivalent impedance of the transistor 336 according to the signals received by the non-inverting terminal and inverting terminal thereof, so as to make the potential of the signals received by the non-inverting terminal be identical to the inverting terminal. So, the current flowing through the current detection resistor $R_{cd}$ and the transistor 336 is proportional to the load current flowing through the transistor 330. The current mirror copies the current flowing through the current detection resistor $R_{cd}$ as a current detection signal, which is provided to the compensation circuit. In this embodiment, the current direction is from the compensation circuit into the current mirror.

The compensation circuit includes a compensation resistor $R_{co}$, an amplifier 345, a current source I and a compensation reference resistor $R_{cs}$. The compensation resistor $R_{co}$ is coupled to a non-inverting terminal and an output terminal of the amplifier 345, and the current mirror of the current detection circuit 340 provides with the current flowing through the compensation resistor $R_{co}$. Therefore, the voltage across the compensation resistor $R_{co}$ is proportional to the load current. A current of current source I flows through the compensation reference resistor $R_{cs}$ to generate a compensation reference voltage $V_{rcs}$, to an inverting terminal of amplifier 345. A non-inverting terminal and the inverting terminal of the amplifier 345 have an equal potential, and so the potential of a compensation signal output from the amplifier 345 is the compensation reference voltage $V_{rcs}$, plus the voltage across the compensation resistor $R_{co}$. Therefore, the potential of the compensation signal changes with the load voltage (current detection signal). In this embodiment, when the load current increases, the potential of the compensation signal increases accordingly.

The feedback control circuit includes an error amplifier 315 and a drive circuit 310. A non-inverting terminal of the error amplifier 315 is coupled to the output terminal of the amplifier 345, and an inverting terminal of the same receives a feedback signal representing the compensation output voltage $V_o'$. In this embodiment, the feedback signal is generated by a voltage divider detecting the compensation output voltage $V_o'$, and the voltage divider includes the series resistors $R_1'$ and $R_2'$. The error amplifier 315 controls a voltage across the transistor 330 via the drive circuit 310 according to the signals received by the inverting terminal and the non-inverting terminal. When the load current increases, the voltage across the transistor 330 decreases for raising the compensation output voltage $V_o'$; when the load current decreases, the voltage across the transistor 330 increases so that the compensation output voltage $V_o'$ drops. Through adjusting the voltage across the transistor 330, the cable drop between cable drop compensation circuit and the load $R_L$ can be compensated.

The cable drop compensation circuit 300 can be an integrated circuit. The current detection circuit 340, a feedback control circuit and a compensation circuit are encapsulated in a single package, and coupled with a compensation setting component via a pin, which is the compensation reference resistor $R_{cs}$. The user can adjust the compensation reference resistor $R_{cs}$ to adjust the compensation amount of the cable drop compensation circuit 300.

In this embodiment, the cable drop compensation circuit 300 may additionally include a protection circuit. The protection circuit includes a latch circuit 320, an overcurrent judgment circuit, a current source I and an overcurrent reference resistor $R_{oc}$. The overcurrent judgment circuit includes a comparator 325. The current source I provides a current flowing through the overcurrent reference resistor Roc to generate an overcurrent reference voltage $V_{roc}$ to an inverting terminal of the comparator 325. A non-inverting terminal of the comparator 325 is coupled to one end of the transistor 330 to detect the compensation output voltage $V_o'$. When the compensation output voltage $V_o'$ is higher than the overcurrent reference voltage $V_{roc}$, which represents the load current is higher than an overcurrent protection value. The comparator 325 outputs a protection signal $S_p$ to the latch circuit 320. At the same moment, the latch circuit 320 starts the latch protection, so that the drive circuit 310 cuts off the transistor 330 to stop the load current $I_L$ supplied to the load $R_L$ until the circuit is restarted. The overcurrent protection value is greater than the predetermined compensation value, generally greater than or equal to a nominal output current of the cable drop compensation circuit 300.

Of course, the protection circuit may be simultaneously encapsulated in a single package, so that the cable drop compensation circuit of the present invention can be integrated. Moreover, an overcurrent setting component (i.e. overcurrent reference resistor $R_{oc}$) can be externally added via a pin, which can maintain adaptive at the time the circuit is integrated.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

The invention claimed is:

1. A cable drop compensation circuit, comprising:
   a current detection circuit, detecting a load current supplied by a DC output circuit to a load and generating a current detection signal;
   a compensation judgment circuit, receiving the current detection signal and generating a judgment signal when judging the load current higher than a predetermined compensation value; and
   a compensation circuit, generating a compensation signal when receiving the judgment signal;
   wherein the DC output circuit raises an output voltage by a compensation voltage in response to the compensation signal.

2. The cable drop compensation circuit of claim 1, wherein the compensation voltage is a constant ratio of the output voltage, regardless of the load current.

3. The cable drop compensation circuit of claim 1, further comprising a protection circuit, the protection circuit comprising:
   a switch coupled between the DC output circuit and the load; and
   an overcurrent judgment circuit for cutting off the switch to stop the load current being supplied to the load when the load current is higher than an overcurrent protection value.

4. The cable drop compensation circuit of claim 3, wherein the current detection circuit, the compensation judgment circuit, the compensation circuit and the protection circuit are encapsulated within a single package, the compensation judgment circuit being coupled to a compensation setting component via a first pin of the package and determining the predetermined compensation value in accordance with the compensation setting component, and the protection circuit being coupled to an overcurrent setting component via a second pin of the package and determining the overcurrent protection value in accordance with the overcurrent component.

5. The cable drop compensation circuit of claim 1, wherein the current detection circuit, the compensation judgment circuit and the compensation circuit are encapsulated within a single package, the compensation judgment circuit being coupled to a setting component via a pin of the package and determining the predetermined compensation value in accordance with the setting component.

6. The cable drop compensation circuit of claim 1, wherein the current detection circuit, the compensation judgment circuit, the compensation circuit and the DC output circuit are encapsulated within a single package, the compensation judgment circuit being coupled to a setting component via a pin of the package, determining the predetermined compensation value in accordance with the setting component.

7. The cable drop compensation circuit of claim 6, wherein the compensation voltage is proportional to the load current.

8. A power circuit with cable drop compensation, comprising:
   a DC output circuit for providing an output voltage and adjusting the output voltage according to a feedback signal; and
   at least two cable drop compensation circuits respectively coupled between the DC output circuit and a corresponding load, each of the cable drop compensation circuit comprising:
      a current detection circuit, detecting a load current of the corresponding load and generating a current detection signal accordingly;
      a compensation judgment circuit, receiving the current detection signal and generating a judgment signal when judging the load current greater than a predetermined compensation value; and
      a compensation circuit generating a compensation signal when receiving the judgment signal;
   wherein the DC output circuit raises the output voltage by a compensation voltage in response to at least one of the compensation signals.

9. The power circuit with cable drop compensation circuit of claim 8, wherein the compensation voltage is raised in a stepwise manner corresponding to the number of the compensation signals generated by the cable drop compensation circuits.

10. The power circuit with cable drop compensation of claim 8, wherein each of the cable drop compensation circuit is coupled to the feedback signal via a diode.

11. The power circuit with cable drop compensation of claim 8, wherein the DC output circuit raises the output voltage by the compensation voltage when any cable drop compensation circuit generates the compensation signal, and the compensation voltage is a constant ratio of the output voltage, regardless of a number of the compensation signal.

12. The power circuit with cable drop compensation of claim 8, wherein each of the cable drop compensation circuit further comprises a protection circuit, the protection circuit comprising:
   a switch coupled between the DC output circuit and the corresponding load; and
   an overcurrent judgment circuit for cutting off the switch to stop the load current flowing to the corresponding load when the load current of the corresponding load is higher than an overcurrent protection value.

13. A cable drop compensation circuit, coupled to a DC output circuit, and outputting a compensation output voltage, the cable drop compensation circuit comprising:

a current detection circuit detecting a load current supplied to the load by the DC output circuit and generating a current detection signal accordingly;

a compensation circuit for generating a compensation signal according to the current detection signal; and a feedback control circuit for adjusting a voltage across a transistor according to a compensation signal and a feedback signal representing the compensation output voltage, wherein the transistor is coupled between the DC output circuit and the load.

14. A cable drop compensation circuit of claim 13, further comprising a protection circuit, wherein the protection circuit cuts off the transistor to stop the load current supplied to the load when the compensation output voltage is higher than an overcurrent reference voltage.

15. The cable drop compensation circuit of claim 14, wherein the current detection circuit, the feedback control circuit, the compensation circuit and the protection circuit are encapsulated within a single package, the compensation circuit coupled to a compensation setting component via a first pin of the package, and the protection circuit coupled to an overcurrent setting component via a second pin of the package and determining the overcurrent protection value in accordance with the overcurrent setting component.

* * * * *